No. 791,063. PATENTED MAY 30, 1905.
A. F. WICHMAN & P. A. MEYER.
UNIVERSAL PIPE COUPLING.
APPLICATION FILED OCT. 17, 1904.
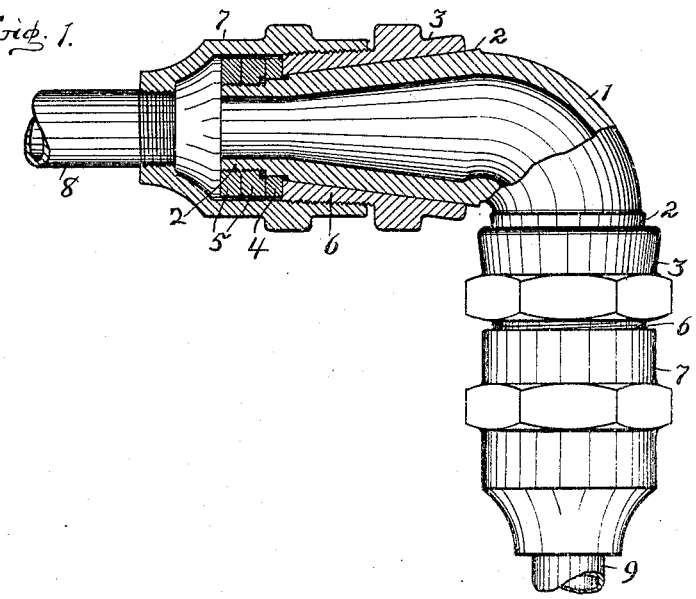
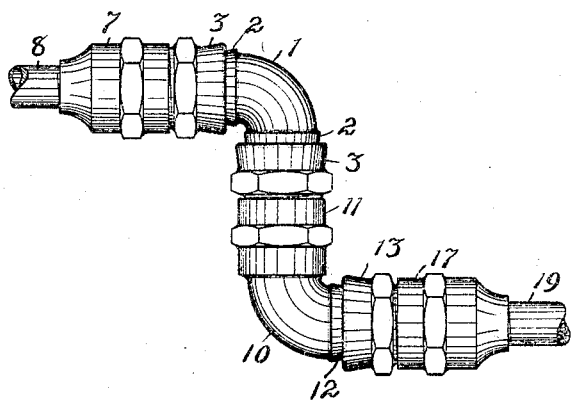

No. 791,063. Patented May 30, 1905.

UNITED STATES PATENT OFFICE.

ADOLPH F. WICHMAN AND PAUL A. MEYER, OF FORT WAYNE, INDIANA, ASSIGNORS OF ONE-THIRD TO THOMAS DOYLE, OF FORT WAYNE, INDIANA.

UNIVERSAL PIPE-COUPLING.

SPECIFICATION forming part of Letters Patent No. 791,063, dated May 30, 1905.

Application filed October 17, 1904. Serial No. 228,664.

*To all whom it may concern:*

Be it known that we, ADOLPH F. WICHMAN and PAUL A. MEYER, citizens of the United States of America, and residents of Fort Wayne, in the county of Allen and State of Indiana, have invented certain new and useful Improvements in Universal Pipe-Couplings, of which the following is a specification.

This invention relates to improvements in universal pipe-couplings; and the object thereof is to afford a fluid-tight coupling for pipes which will admit of said pipes being shifted in relative position without affecting the passage of fluid from one pipe through said coupling to the other.

We accomplish our object by the construction illustrated in the accompanying drawings, in which—

Figure 1 is a plan, partly in section, showing the invention; and Fig. 2 is a plan showing the incorporation of an extension-coupling.

Similar numerals of reference indicate corresponding parts in both views.

Referring now to the drawings, 1 is a tubular angle-casting having at each of its ends a taper bearing 2. Internally-taper-bored sleeves 3 are mounted, respectively, upon said bearings 2, so as to turn thereon, and are held in place by means of collars 4 and jam-nuts 5, which are attached upon the threaded extensions 2' of the angle-casting. The outer ends 6 of said sleeves are externally screw-threaded and have mounted thereon sleeve-couplings 7, with which the pipes 8 and 9 are respectively connected. By this construction either of the pipes may be swung or turned without affecting the position of the other.

In Fig. 2 is shown a second angle-casting 10, having at one end an integral sleeve 11, which is connected upon one of the sleeves 3 of the former angle-casting. The said angle-casting 10 has also a taper bearing 12, upon which is mounted a sleeve 13, which is identical to the sleeves 3 above mentioned and bears the same relation to the taper bearing 12 as the sleeves 3 do to the bearings 2. A sleeve-coupling 17, having a pipe 19 in connection therewith, is attached to the sleeve 13 the same as the coupling 7 is secured to the sleeve 3 above mentioned. By this arrangement the pipes 8 and 19 are accommodated to a wider range of adjustment.

The connections between the sleeves 3 and bearings 2 and between the sleeve 13 and bearing 12 are closely fitted, their contacting faces being ground so that the bearings will seat perfectly in the sleeves, and thereby prevent escape of fluid through the joint thus effected.

Having described our invention, what we claim, and desire to secure by Letters Patent, is—

1. In a device of the class described, a tubular angle-casting having upon each of its ends a taper bearing and threaded extension; a sleeve having a ground fit, one upon each of said bearings; jam-nuts on each of said threaded extensions; a loose collar interposed between the ends of the respective sleeves and the adjacent jam-nuts; and sleeve-couplings extending loosely over said jam-nuts and collars and connected with the corresponding sleeves respectively.

2. In a device of the class described, a tubular angle-casting having at each of its ends a taper bearing; a sleeve mounted upon each of said bearings to turn thereon; a sleeve-coupling connected to one of said sleeves and being adapted for attachment with a pipe; and a second angle-casting having connection at one of its ends with the other of said sleeves, and having at its other end a taper bearing in connection with a sleeve and sleeve-coupling.

In testimony whereof we affix our signatures in presence of two witnesses.

ADOLPH F. WICHMAN.
PAUL A. MEYER.

Witnesses:
J. N. DICKENS,
W. G. BURNS.